US008891156B2

(12) United States Patent
Yang et al.

(10) Patent No.: US 8,891,156 B2
(45) Date of Patent: Nov. 18, 2014

(54) MICROCUP DESIGNS FOR ELECTROPHORETIC DISPLAY

(71) Applicant: Sipix Imaging, Inc., Fremont, CA (US)

(72) Inventors: Bo-Ru Yang, Banqiao (TW); Craig Lin, San Jose, CA (US); Yih-Ming Kang, Fremont, CA (US)

(73) Assignee: E Ink California, LLC, Fremont, CA (US)

( * ) Notice: Subject to any disclaimer, the term of this patent is extended or adjusted under 35 U.S.C. 154(b) by 0 days.

(21) Appl. No.: 13/765,588

(22) Filed: Feb. 12, 2013

(65) Prior Publication Data

US 2013/0208343 A1    Aug. 15, 2013

Related U.S. Application Data

(60) Provisional application No. 61/598,725, filed on Feb. 14, 2012.

(51) Int. Cl.
G02B 26/00 (2006.01)
G09G 3/34 (2006.01)
G02F 1/167 (2006.01)

(52) U.S. Cl.
CPC ........ G02F 1/167 (2013.01); *G02F 2001/1672* (2013.01)
USPC .............................. 359/296; 345/107; 345/48

(58) Field of Classification Search
CPC .......... G02B 26/00; G02B 27/60; G02F 1/00; G02F 1/167; G02F 1/1333; G02F 1/133377; G02F 2001/167; G02F 2001/1672; G09G 3/16; G09G 3/34; G09G 3/344

USPC ............ 359/296, 452, 228, 253, 245; 345/33, 345/34, 105–107; 349/84, 86, 89
See application file for complete search history.

(56) References Cited

U.S. PATENT DOCUMENTS

| 6,859,302 | B2 * | 2/2005 | Liang et al. | 359/296 |
| 6,930,818 | B1 | 8/2005 | Liang et al. | |
| 6,947,202 | B2 * | 9/2005 | Liang et al. | 359/296 |
| 6,972,893 | B2 * | 12/2005 | Chen et al. | 359/296 |
| 7,141,279 | B2 * | 11/2006 | Liang et al. | 428/1.5 |
| 7,205,355 | B2 * | 4/2007 | Liang et al. | 524/474 |

(Continued)

FOREIGN PATENT DOCUMENTS

JP 2005-024868 A 1/2005
WO WO 01/67170 9/2001

OTHER PUBLICATIONS

Nikkei Microdevices. (Dec. 2002) Newly-Developed Color Electronic Paper Promises—Unbeatable Production Efficiency. *Nikkei Microdevices, p3.* (in Japanese, with English translation).

(Continued)

*Primary Examiner* — Loha Ben
(74) *Attorney, Agent, or Firm* — Perkins Coie LLP

(57) ABSTRACT

The present invention is directed to an electrophoretic display film comprising: a) microcups each having a first shape, and b) remaining microcups which take up at least 10% of the total number of microcups and have shapes different from the first shape. The microcup designs of the present invention not only may reduce the Moiré pattern, but it may also make the defects of the microcup walls much less noticeable, and therefore increase the cutting yield.

24 Claims, 13 Drawing Sheets

(56) References Cited

U.S. PATENT DOCUMENTS

| | | | | |
|---|---|---|---|---|
| 8,023,071 | B2* | 9/2011 | Liang et al. | 349/86 |
| 8,077,283 | B2 | 12/2011 | Van Veenendaal et al. | |
| 8,154,790 | B2* | 4/2012 | Wang et al. | 359/296 |
| 8,441,414 | B2* | 5/2013 | Lin | 345/48 |
| 2011/0063196 | A1 | 3/2011 | Kwak et al. | |
| 2011/0097549 | A1 | 4/2011 | Verschueren et al. | |
| 2011/0176198 | A1 | 7/2011 | Tanaka et al. | |

OTHER PUBLICATIONS

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C., & Tseng, S. (Feb. 2003). *Microcup® LCD, A New Type of Dispersed LCD by a Roll-to-Roll Manufacturing Process*. Paper presented at the IDMC, Taipei, Taiwan.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-628.

Chen, S.M. (May 2003) The New Application and the Dynamics of Companies. *TRI*. 1-10. (In Chinese, English abstract attached).

Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.

Lee, H., & Liang, R.C. (Jun. 2003) SiPix Microcup® Electronic Paper—An Introduction. *Advanced Display*, Issue 37, 4-9 (in Chinese, English abstract attached).

Chen, S.M. (Jul. 2003) The Applications for the Revolutionary Electronic Paper Technology. *OPTO News & Letters*, 102, 37-41. (in Chinese, English abstract attached).

Zang, H.M., & Liang, R.C. (2003) Microcup Electronic Paper by Roll-to-Roll Manufacturing Processes. *The Spectrum*, 16(2), 16-21.

Kleper, M., Miller, P., Miller L. (Oct. 2003) An Investigation of the Emerging and Developing Technologies Related to the Generation Beyond Print-on-Paper. *Advanced Display Technologies*, Oct. 2003, pp. 13-15, Rochester Institute of Technology (R.I.T.).

Allen, K. (Oct. 2003). Electrophoretics Fulfilled. *Emerging Displays Review: Emerging Display Technologies, Monthly Report*—Oct. 9-14, 2003.

Zang, H.M. (Oct. 2003). *Microcup® Electronic Paper by Roll-to-Roll Manufacturing Processes*. Presentation conducted at the Advisory Board Meeting, Bowling Green State University, Ohio, USA.

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Ho, C., & Liang, R.C. (Dec. 2003). *Microcup® Electronic Paper by Roll-to-Roll Manufacturing Processes*. Presentation conducted at FEG, Nei-Li, Taiwan.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging, SPIE* vol. 5289, 102-108.

Zang, H.M. (Feb. 2004). *Microcup Electronic Paper*. Presentation conducted at the Displays & Microelectronics Conference of U.S. Display Consortium, Phoenix, Arizona, USA.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Liang, R.C. (Oct. 2004) *Flexible and Roll-able Displays/Electronic Paper—A Technology Overview*. Paper presented at the METS 2004 Conference in Taipei, Taiwan.

Bardsley, J.N. & Pinnel, M.R. (Nov. 2004) Microcup™ Electrophoretic Displays. *USDC Flexible Display Report*, 3.1.2. pp. 3-12-3-16.

Ho, Candice. (Feb. 1, 2005) *Microcupt® Electronic Paper Device and Application*. Presentation conducted at USDC 4th Annual Flexible Display Conference 2005.

Zang, H.M. & Hou, Jack, (Feb. 2005) *Flexible Microcup® EPD by RTR Process*. Presentation conducted at 2$^{nd}$ Annual Paper-Like Displays Conference, Feb. 9-11, 2005, St. Pete Beach, Florida.

Liang, R.C., (Feb. 2005) *Flexible and Roll-able Displays/Electronic Paper—A Brief Technology Overview*. Flexible Display Forum, 2005, Taiwan.

Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.

Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings*, pp. 362-365.

Wang, X., Zang, H.M. and Li, P. (Jun. 2006) Roll-to-Roll Manufacturing Process for Full Color Electrophoretic film. *SID Digest*, 2006, pp. 1587-1589.

Zang, H.M. (Sep. 2006) *Monochrome and Area Color Microcup® EPDs by Roll-to-Roll Manufacturing Process*. Presentation conducted at the Fourth Organic Electronics Conference and Exhibition (OEC-06), Sep. 25-27, 2006, Frankfurt, Germany.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Zang, H.M. (Feb. 2007) *Developments in Microcup® Flexible Displays*. Presentation conducted at the 6th Annual Flexible Display and Microelectronics Conference, Phoenix, AZ Feb. 6-8.

Zang, H.M., Wang, F., Kang, Y.M., Chen, Y. and Lin, W. (Jul. 2007) *Microcup® e-Paper for Embedded and Flexible Designs*. IDMC'07, Taipei International Convention Center, Taiwan.

Sprague, R.A. (Sep. 23, 2009) SiPix Microcup Electrophoretic Epaper for Ebooks. *NIP 25*, 2009 pp. 460-462. (Presentation conducted on Sep. 23, 2009 at the 25th Int'l Conference on Digital Printing Technologies, Digital Fabrication 2009 (NIP 25) by Society for Imaging.

International Search Report for PCT/US2013/025769, mailed May 15, 2013.

* cited by examiner

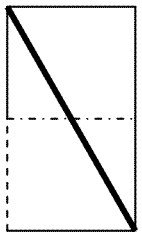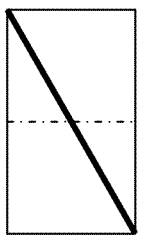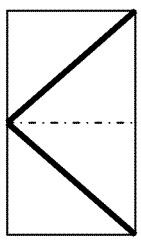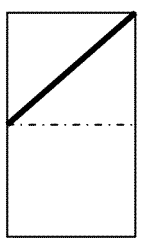
Figure 2

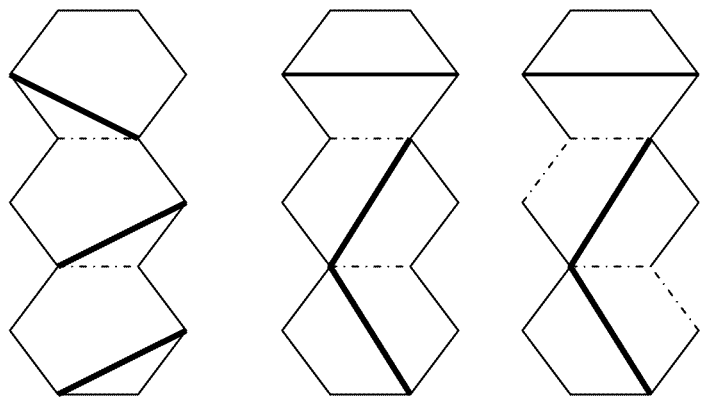
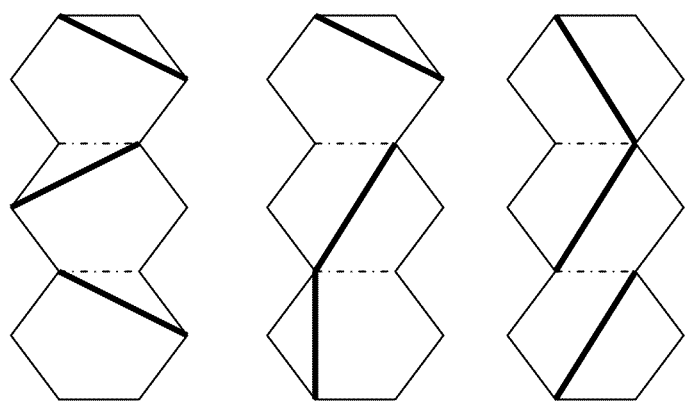
Figure 3

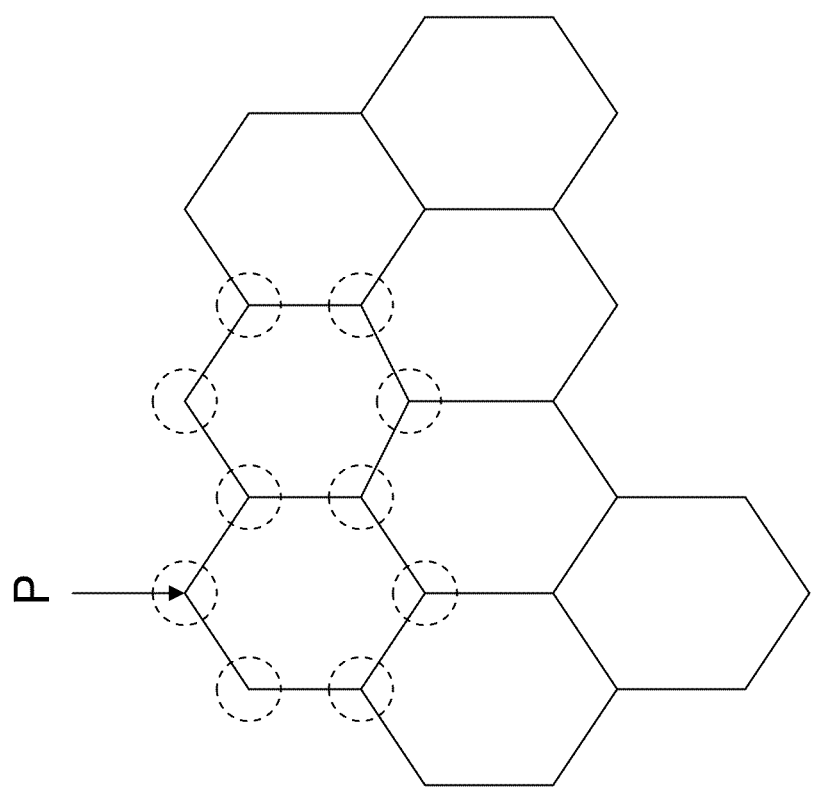

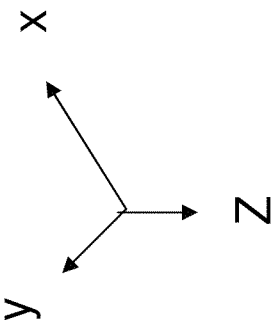
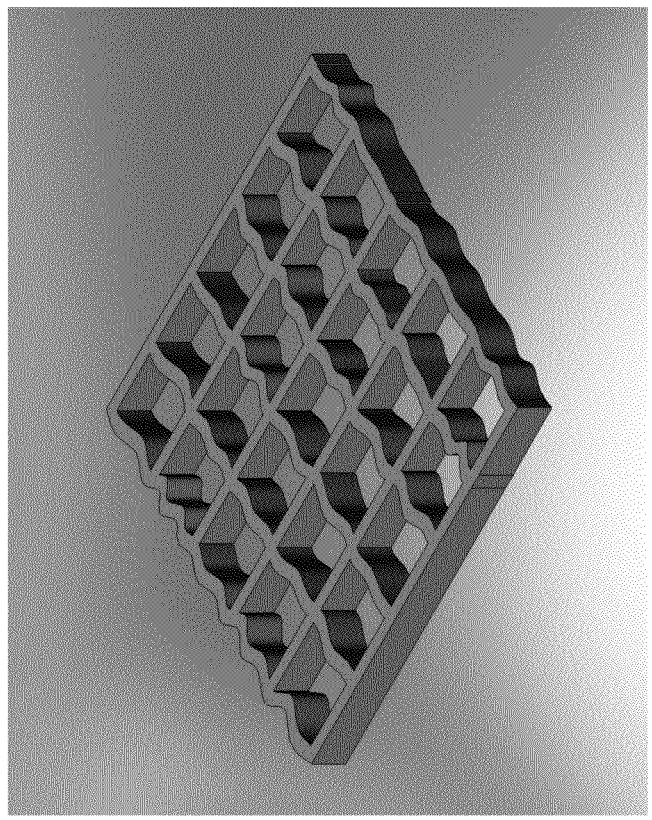
Figure 7

MICROCUP DESIGNS FOR ELECTROPHORETIC DISPLAY

This application claims priority to U.S. Provisional Application No. 61/598,725, filed Feb. 14, 2012; the content of which is incorporated herein by reference in its entirety.

FIELD OF THE INVENTION

The present invention is directed to microcup designs for electrophoretic displays, aiming to both reduce noticeable defects of display images and avoid Moirè.

BACKGROUND OF THE INVENTION

U.S. Pat. No. 6,930,818 discloses an electrophoretic display based on the microcup technology. The patent describes the manufacture of microcups as display cells, by microembossing or imagewise exposure. The microcups are then filled with an electrophoretic fluid comprising charged pigment particles dispersed in a solvent or solvent mixture.

The top openings of the microcups traditionally may have the same size and shape and such microcups spread across the entire display surface. For example, all of the microcups may have a top opening of a square shape or all of the microcups may have a top opening of a hexagonal shape, on the viewing side.

For this traditional type of design, because the microcups are not randomized, the Moiré pattern can occur when the microcup film is laminated to a TFT backplane which also has a repeatable regular pattern. If a color filter is utilized in such a display device, the Moiré pattern is even more severe because the color filter also has a repeatable regular pattern.

By rotating the microcups to a less severe angle, the Moiré phenomenon may be reduced. However, such structural changes could reduce the cutting yield and also because the rotation angle must be precise, it could increase the processing cost.

BRIEF DISCUSSION OF THE DRAWINGS

FIGS. 2 and 3 illustrate how the opening shapes of microcups may be randomized.

FIGS. 5(*a*)-5(*c*) illustrate an alternative aspect of the present invention.

Figure 6:

FIG. 6 shows a TFT backplane laminated to a display film with microcups (a) having the same shape, and (b) having randomized shapes.

FIG. 7 is a three-dimensional view of a microcup film with wavy partition walls.

Figure 8:
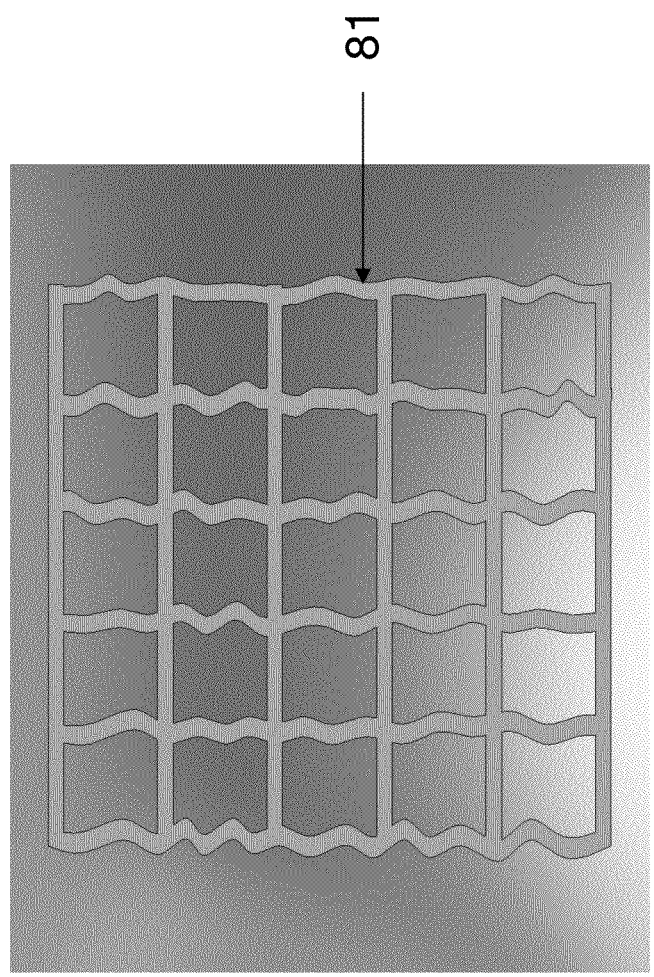

FIG. 8 is a top view of a microcup film with wavy partition walls.

Figure 9:
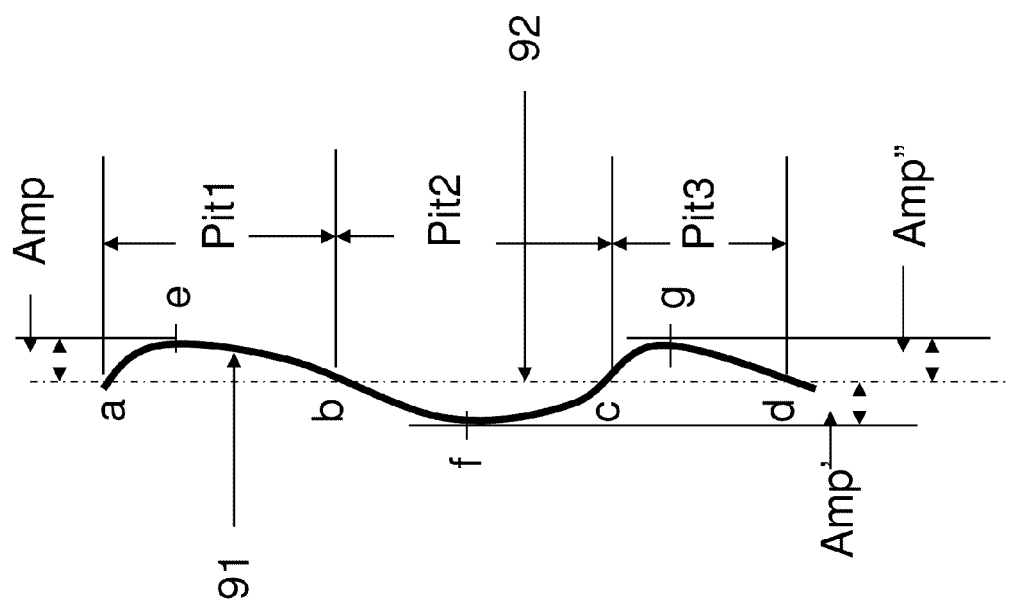

FIG. 9 depicts the pitches and amplitudes of a wavy partition wall.

FIG. 10 illustrates microcups with wavy partition walls.

SUMMARY OF THE PRESENT INVENTION

One aspect of the present invention is directed to an electrophoretic display film comprising:
a) microcups which have a first shape, and
b) remaining microcups which take up at least 10% of the total number of microcups and have shapes which are different from the first shape.

In one embodiment, the remaining microcups take up at least 30% of the total number of microcups. In another embodiment, the remaining microcups take up at least 50% of the total number of microcups.

In one embodiment, the microcups of (b) are randomly interspersed among the microcups of (a).

In one embodiment, the microcups of (b) are formed by removing partition walls of a predetermined number of microcups of (a), and replacing the removed partition walls with new partition walls.

In another embodiment, the microcups of (b) are formed by independently shifting each of the apex points in a predetermined number of microcups of (a) within a defined area, and reconnecting the shifted apex points.

In one embodiment, the defined area is a circle. In one embodiment, an apex points are independently shifted by $\Delta x$ in the X direction and $\Delta y$ in the Y direction. In one embodiment, the absolute value of $\Delta x$ or $\Delta y$ does not exceed the radius of a circle as the defined area.

In one embodiment, an electrophoretic display film comprises microcups wherein all microcups have individually different shapes.

A further aspect of the invention is directed to an electrophoretic display comprising microcups wherein at least one of the microcups comprises a wavy partition wall.

In one embodiment, pitches of the wavy partition walls are different.

In one embodiment, amplitudes of the wavy partition walls are different.

In one embodiment, pitches of the wavy partition walls are different and amplitudes of the wavy partition walls are the same.

In one embodiment, amplitudes of the wavy partition walls are different and pitches of the wavy partition walls are the same.

In one embodiment, amplitudes of the wavy partition walls are different and pitches of the wavy partition walls are different.

In one embodiment, at least one of the microcups has a square opening and at least one set of the parallel partition walls is wavy.

In one embodiment, at least one of the microcups has a hexagonal opening and at least one set of the parallel partition walls is wavy.

In one embodiment, the wavy partition wall has a pitch ranging from 5 μm-2000 μm.

In one embodiment, the wavy partition wall has an amplitude ranging from 0.1 μm to 20 μm.

DETAILED DESCRIPTION OF THE INVENTION

The present invention is directed to minimize the Moiré pattern or visual defects in a display device by randomizing the shapes of microcups or partition walls of microcups.

Figure 1:
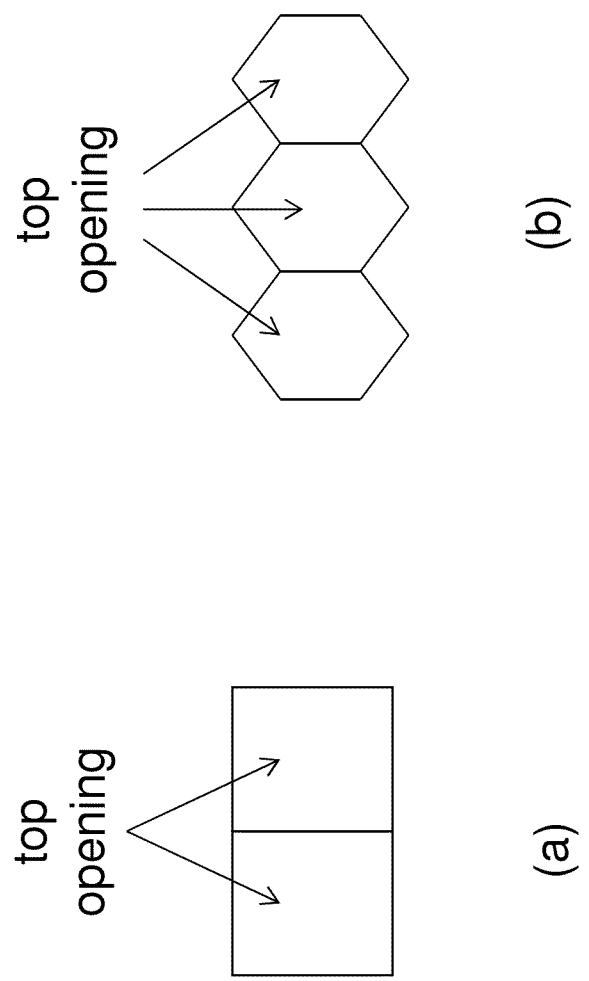
FIG. 1 depicts microcups having (a) a square opening and (b) a hexagon opening, respectively.

The term "shape", in the present invention, refers to the shape of the top opening of a microcup, on the viewing side. For example, a microcup may have a square opening (i.e., square shape) as shown in FIG. 1(*a*) or a hexagonal opening (i.e., hexagonal shape) as shown in FIG. 1(*b*).

In one aspect of the present invention, the microcups may be randomized by removing partition walls (dotted lines) of microcups having the same shape and replacing the removed partition walls with new partition walls (solid dark lines), as shown in FIGS. 2 and 3. A new partition wall may be formed by connecting two apex points which are not the same two apex points connecting a removed wall.

Starting with all microcups having the same size and shape, it is preferred that at least 10%, and more preferred that at least 30%, of the microcups are altered in this method. In addition, the altered microcups are preferably randomly interspersed among the unaltered microcups.

As to which partition walls to remove and where to add new partition walls, one criterion is that in the final design, the fill factor must be substantially maintained. More specifically, the fill factor of the altered microcup-based film can not be altered by more than 30% of that of the original microcup-based film having microcups having the same size and shape.

Figure 4:
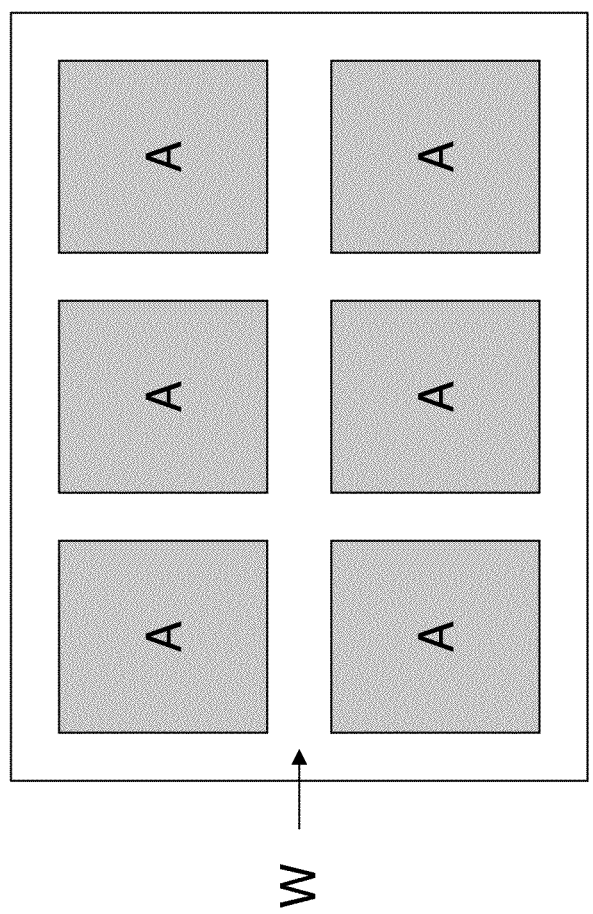
FIG. 4 illustrates the "fill factor" of a microcup-based display film.

The fill factor is determined by the area other than the wall area divided by the entire area. As shown in FIG. 4, the fill factor is the sum of area A (where the display fluid is present) divided by the sum of the area A and the area W (the wall area).

Figure 5B:
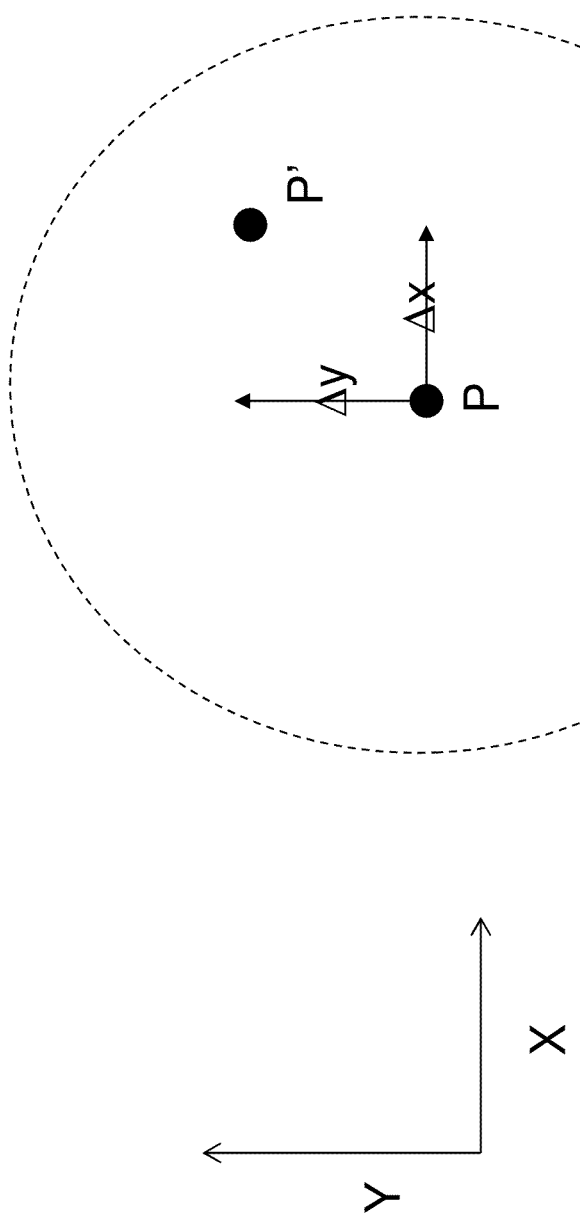
Figure 5C:
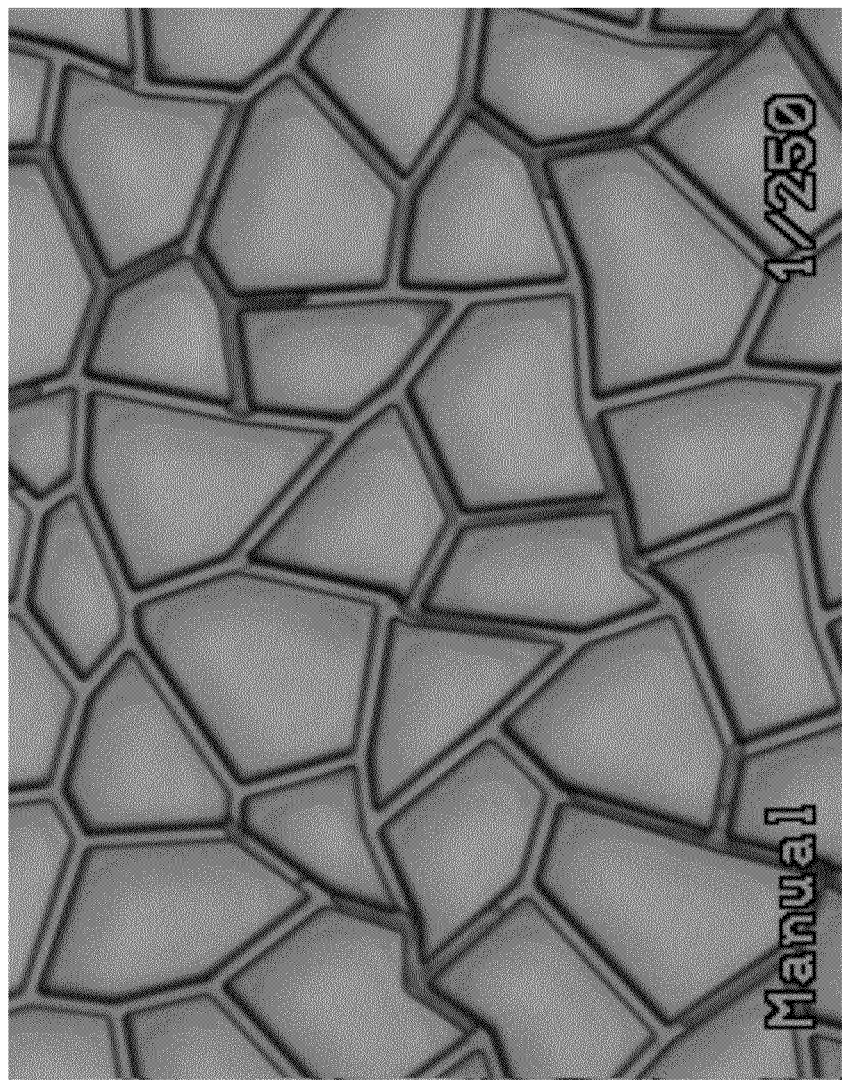

In another aspect, the shapes of the microcups may be randomized as shown in FIGS. 5(a)-5(c). In FIG. 5(a), the original microcups have the same shape, a hexagon. In randomizing the shape, each of the apex points (P) of the hexagons may be independently shifted within a defined area. The defined areas have the same size and shape around each apex point. In the example of FIG. 5(a), a circle as the defined area is shown around each apex point.

In FIG. 5(b), the original apex point (P) is shown to be shifted by a distance of $\Delta x$ in the X direction and a distance of $\Delta y$ in the Y direction, to point P'. The values of $\Delta x$ and $\Delta y$ may be positive or negative, depending on the direction of the shift.

When the defined area is a circle as shown, $\Delta x$ or $\Delta y$ is greater than zero; but its absolute value cannot exceed the radium of the circle.

An example is given here to illustrate this method. It is assumed that an original arrangement has regular hexagon-shaped microcups which have a nominal pitch of 100 μm. The term "nominal pitch" is intended for the original X and Y coordinates of a regular hexagon-shaped microcup.

In this example, it is further assumed that the absolute values of both $\Delta x$ and $\Delta y$ range between 10 μm and 25 μm, which means that the original apex point may move a distance of at least 10 μm but not exceeding 25 μm in either the X or the Y direction. As stated above, the $\Delta x$ and $\Delta y$ may be positive or negative, depending on the direction of the shift.

After shifting, the apex points are then reconnected.

This method is carried out with the aid of a computer program, such as CAD or equivalent by feeding the predetermined parameters into the program. The randomized microcups resulted from this example are shown in FIG. 5(c).

Since the sum of $\Delta x$ for all apex points should be substantially zero, the nominal pitch of the resulting microcups remains to be about 100 μm, on average. This also applies to $\Delta y$. The fill factor will also remain substantially the same before and after randomization.

It is also noted that greater $\Delta x$ or $\Delta y$ would result in a higher degree of randomness in the altered microcups. The maximum of $\Delta x$ or $\Delta y$ should be controlled to be no greater than the original side length of a hexagon, preferably no greater than 50% of the original side length of the hexagon.

This method can be applied to microcups of other shapes, such as square, triangle or octagon.

FIG. 6a shows a microcup-based film in which the microcups having the same hexagon shape are laminated to a TFT backplane. In this case, a Moirè pattern is visible. FIG. 6b shows a microcup-based film in which the microcups having random shapes are laminated to a TFT backplane and no Moirè pattern is observed.

A further aspect of the present invention is directed to altering the partition walls of the microcups. FIG. 7 is a three-dimensional view in which the partition walls along one of the axes of the microcups (e.g., the X-axis) are pseudo-random while the partition walls along the Y axis are still straight lines.

This alteration only occurs on the X/Y plane; but not on the Z axis, which means the height of the microcup walls will be kept unchanged.

FIG. 8 is the top view of this microcup design and it can be seen that the pitch may vary from one curvature in a microcup wall to another curvature in the same microcup wall. This is further illustrated in FIG. 9 which depicts a wavy microcup wall (91) which is the wall (81) depicted in FIG. 8.

For illustration purpose, there is a vertical reference line (92) which intersects the wavy wall (91) at four points, "a", "b", "c" and "d". The distance between point "a" and "b" is a first pitch, Pit1; the distance between point "b" and "c" is a second pitch, Pit2; and the distance between point "c" and "d" is a third pitch, Pit3. In the context of the present invention, Pit1, Pit2 and Pit3, are preferably different. In another embodiment, at least two of them may be equal.

Another parameter defining the wavy microcup wall is the amplitude, which is the distance between the reference line 92 and the outer-most point on a curvature in the wavy wall 91. As shown in FIG. 9, there are three outer-most points on the wave wall, "e", "f" and "g". The distance between the reference line 92 and point "e" is a first amplitude, Amp; the distance between the reference line 92 and point "f" is a second amplitude, Amp'; and the distance between the reference line 92 and point "g" is a third amplitude, Amp". In the context of the present invention, Amp, Amp' and Amp", are preferably different. In another embodiment, at least two of them may be equal.

In one embodiment, the pitches Pit1=Pit2=Pit3 and Amp≠Amp'≠Amp". In another embodiment, Amp=Amp'=Amp" and Pit1≠Pit2≠Pit3. In a further embodiment, Pit1≠Pit2≠Pit3 and Amp≠Amp'≠Amp".

Some of the partition walls are shown to be wavy in a top view in FIG. 8. However it is noted that the curvature extends throughout the depth of the entire wall area, as shown in FIG. 7.

In the present design, the pitch could be ranged from 5 μm-2000 μm, while amplitude could be varied from 0.1 μm to 20 μm. The pitch and the amplitude, as explained above, may be independently varied.

Figure 10A:
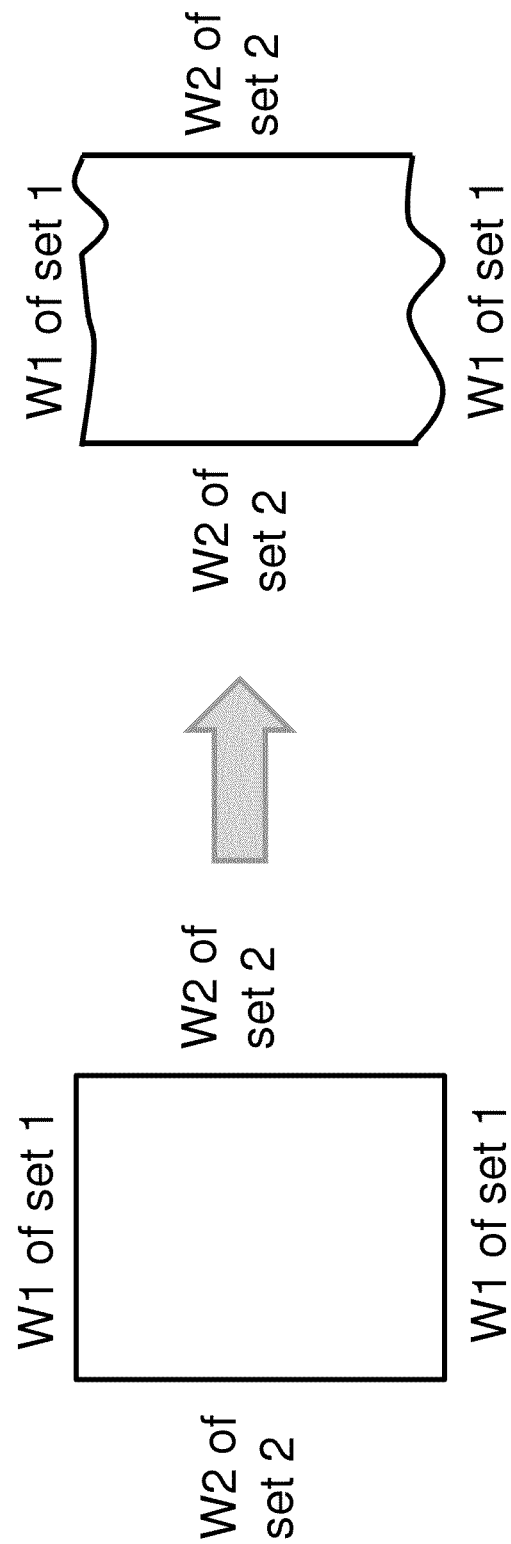

In one embodiment of the present design, the wavy walls only occur in one axis. However they may also occur in both axes. FIG. 10a depicts a microcup having a square opening. In this case, there are two sets of partition walls, set 1 and set 2. Each set has two partition walls which are parallel to each other. According to the present invention, set 1 of both partition walls, W1 may be changed to be wavy (as shown), or set 2 of both partition walls, W2, may be changed to be wavy (not shown), or both sets of the partition walls may be changed to be wavy (not shown).

Figure 10B:
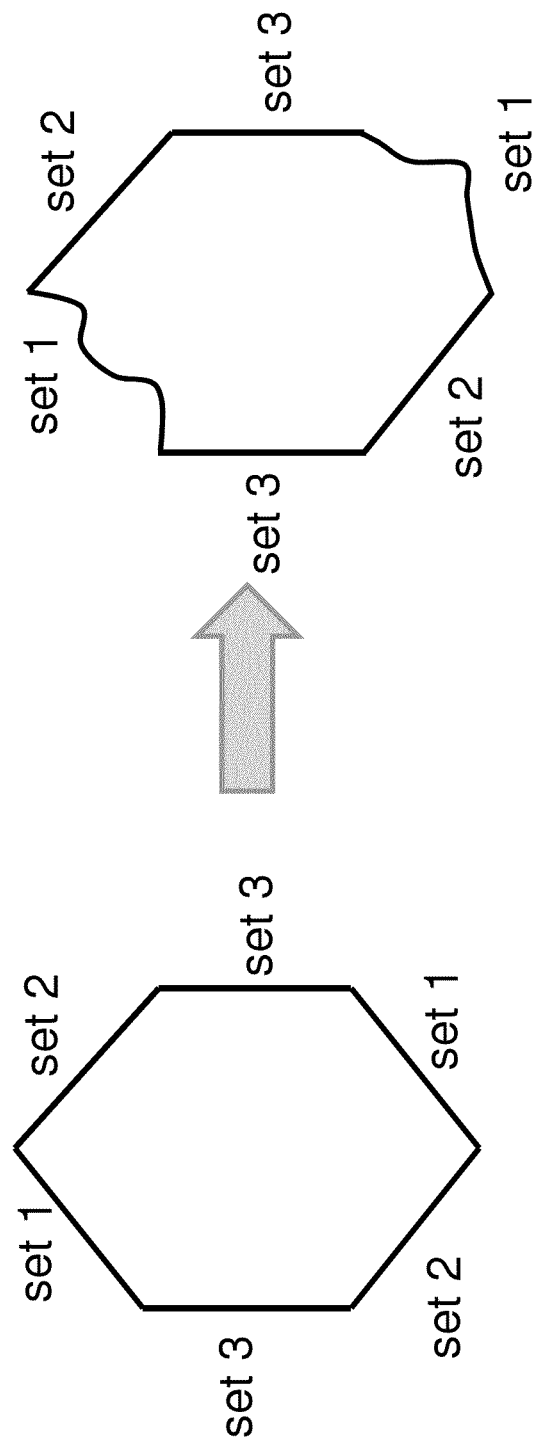

The top opening of the microcups may be hexagonal or any other shapes. FIG. 10b depicts a microcup having a hexagonal top opening. In this case, there are three sets of parallel partition walls, set 1, set 2 and set 3. According to the present invention, at least one set of the partition walls is changed to be wavy. In other words, there may be only one set of partition walls, which is changed to be wavy (as shown), or two of the three sets of the partition walls are changed to be wavy (not shown), or all three sets of the partition walls are changed to be wavy (not shown).

The designs of the present invention may reduce the Moiré pattern. In addition, the randomized microcups or wavy partition walls will result in a fuzzy appearance that the regular shaped microcups do not have, and therefore any small defects (such as scratch or dust) are less noticeable.

The microcups of the present invention may be manufactured by the microembossing process described in U.S. Pat. No. 6,930,818, the content of which is incorporated herein by reference in its entirety. The formed microcups may then be filled and sealed also according to disclosures in this US patent.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. An electrophoretic display film comprising:
    a) microcups each having a first shape, and
    b) remaining microcups which take up at least 10% of the total number of microcups and have shapes different from the first shape.

2. The display film of claim 1, wherein the remaining microcups take up at least 30% of the total number of microcups.

3. The display film of claim 1, wherein the remaining microcups take up at least 50% of the total number of microcups.

4. The display film of claim 1, wherein the microcups of (b) are randomly interspersed among the microcups of (a).

5. The display film of claim 1, wherein the microcups of (b) are formed by removing partition walls of a predetermined number of microcups of (a), and replacing the removed partition walls with new partition walls.

6. The display film of claim 1, wherein the microcups of (b) are formed by independently shifting apex points of a predetermined number of microcups of (a) within a defined area, and reconnecting the shifted apex points.

7. The display film of claim 6, wherein the defined area is a circle.

8. The display film of claim 6, wherein the apex points are independently shifted by $\Delta x$ in the X direction and $\Delta y$ in the Y direction.

9. The display film of claim 8, wherein the absolute value of $\Delta x$ or $\Delta y$ does not exceed the radius of a circle as the defined area.

10. The display film of claim 1, which is laminated to an electrode plate.

11. An electrophoretic display film comprising microcups, wherein all microcups have individually different shapes and they are formed by independently shifting apex points of original microcups within a defined area, and reconnecting the shifted apex points.

12. The display film of claim 11, which is laminated to an electrode plate.

13. An electrophoretic display film comprising microcups, wherein at least one of the microcups comprises at least one wavy partition wall.

14. The display film of claim 13, wherein pitches of the wavy partition wall are different.

15. The display film of claim 13, wherein amplitudes of the wavy partition wall are different.

16. The display film of claim 13, wherein pitches of the wavy partition wall are different and amplitudes of the wavy partition wall are the same.

17. The display film of claim 13, wherein amplitudes of the wavy partition wall are different and pitches of the wavy partition wall are the same.

18. The display film of claim 13, wherein amplitudes of the wavy partition wall are different and pitches of the wavy partition wall are different.

19. The display film of claim 13, wherein the at least one of the microcups has a square opening and at least one set of parallel partition walls is wavy.

20. The display film of claim 13, wherein the at least one of the microcups has a hexagonal opening and at least one set of parallel partition walls is wavy.

21. The display film of claim 13, wherein the wavy partition wall has a pitch ranging from 5 μm-2000 μm.

22. The display film of claim 13, wherein the wavy partition wall has an amplitude ranging from 0.1 μm to 20 μm.

23. The display film of claim 13, which is laminated to an electrode plate.

24. An electrophoretic display film comprising microcups, wherein all microcups have individually different shapes and they are formed by removing partition walls of original microcups and replacing the removed partition walls with new partition walls, each formed by connecting two apex points which are not the same two apex points connecting a removed partition wall.

* * * * *